April 30, 1963  J. B. GOUDRIAAN  3,087,889
METHOD FOR THE DESILICIZING OF FEEDING WATER FOR STEAM BOILERS
Filed Nov. 16, 1959
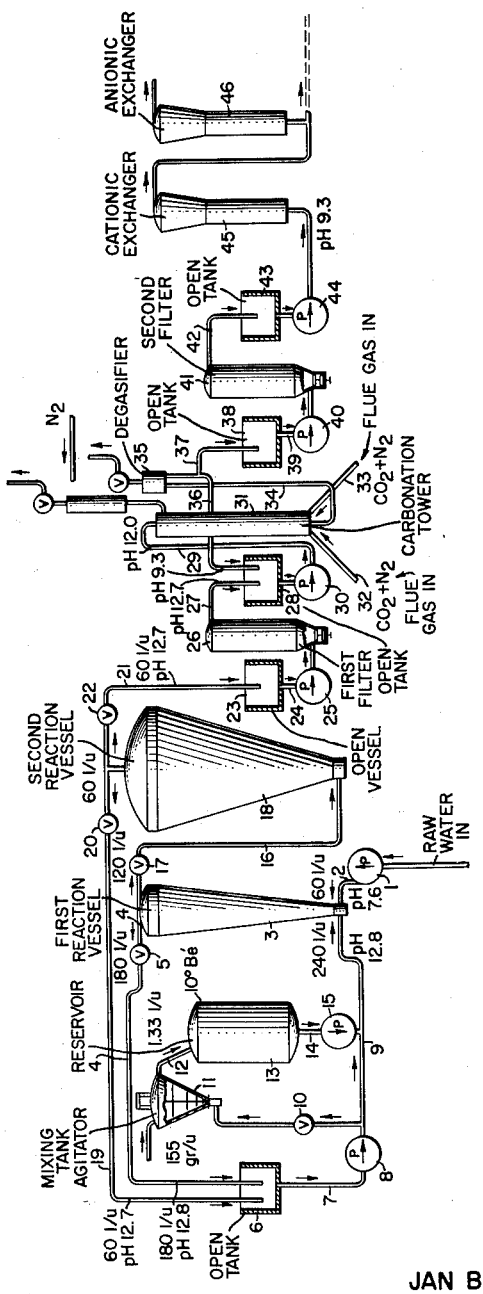
INVENTOR
JAN BERNARD GOUDRIAAN
BY Pierce, Scheffler & Parker
his ATTORNEYS United States Patent Office 3,087,889
Patented Apr. 30, 1963

3,087,889
METHOD FOR THE DESILICIZING OF FEEDING WATER FOR STEAM BOILERS
Jan Bernard Goudriaan, Bennebroek, Netherlands, assignor to N.V. Centrale Suiker Maatschappij, a corporation of the Netherlands and The Paterson Engineering Company, Limited, a corporation of Great Britain
Filed Nov. 16, 1959, Ser. No. 853,198
3 Claims. (Cl. 210—46)

It is known that substantially all natural waters need a pretreatment, the so-called softening to make same suitable as feed water for steam boilers. Often a treatment with lime and soda is applied to take from the water the temporary and the permanent hardness. By this adding of lime the soluble bicarbonates of the alkaline earth metals are changed into the insoluble carbonates while by the following soda treatment a large proportion of the alkaline earth metal ions is removed for the solution.

This so-called softened water then is suitable for use as feed water for steam boilers. Water softened in this way was very satisfactory for many years until high pressure steam turbines began to be used. It appears that the rotor blades of these turbines become coated with a hard layer that can only be removed with difficulty as a result of the silicic acid or silicic ion content of the natural waters that are treated in the above-mentioned way.

Various methods have been tried to desilicize water in order to get feed water for making steam suitable to be used in high pressure steam turbines, for instance by bringing the silica in an ionogenic form, and subsequently removing the latter in an ion exchange unit. On the other hand attempts have been made to desilicize water by using absorbing material in order to absorb the silica or silicic ions. The obtained effect in these known methods is not always sufficient and, moreover, the high price of the chemicals to be used is a drawback of such methods. It has been proposed to desilicize water by using an excess of lime and to prepare a saturated lime water from the whole of the water to be treated by which theoretically the silica and the silicic ions should be bound to produce calcium-silicic acid compounds that are difficultly soluble. This known method has to be carried out at a high temperature and the formed insoluble compounds may be normal silicates or basic salts. Furthermore, it appears that the produced water-insoluble compounds are in the colloidal form which settles very slowly, thus needing a protracted time and a very large apparatus for the separation.

After separation of the silicic-calcium compounds the remaining water is not yet suitable for using as feed water for steam boilers. It still contains calcium ions originating from the excess lime. These calcium ions must be removed. This can be attained by using soda, but in this case an extra amount of sodium ions is introduced into the water rendering it necessary to blow down the boilers more often. This is the reason why it is often preferred to carbonate the water; this is a treatment in which carbon dioxide is introduced into the water, as a result whereof calcium is precipitated in the form of calcium carbonate which, by settling and decanting or filtering, can be removed. Reference may be made to the article by W. Ufer in "Zeitschrift für Angewandte Chemie," 54, 496–498 (1941), as well as the book "Wasseraufbereitung im Dampfkraftbetrieb," by Dr. A. Splittgerber, 1954, page 241 et. seq. where this drawback of a long precipitation time (and thus of a very large apparatus) is mentioned.

It has now been found that the separation of the silicic acid-containing compounds can be accelerated so that a more compact apparatus can be used, and may preferably be carried out at normal atmospheric temperatures by subjecting the raw water to which milk of lime has been added in such proportions as to produce a solution which has a pH of 10–14, to a mechanical frictional treatment, after which the crystallization nuclei formed in the solution subjected to the mechanical frictional treatment are separated so as to produce a liquor still containing silica-calcium compounds in the colloidally dissolved or super-saturated state, which liquor is in part recycled to the limed raw water and is in part carbonated by contact with a gas comprising $CO_2$ and subsequently is separated from the solid phase. Due both to the contact of the recycled silica-calcium compounds in the colloidally dissolved or super-saturated state with the limed raw water and to the mechanical friction treatment, the silica-calcium compounds precipitate can be removed easily by decanting or filtering at normal atmospheric temperatures.

The solid phase which is formed during the carbonation is a precipitate of $CaCO_3$. This precipitate may be removed by settling and decanting, but also by filtering it through a filter preferably precoated by the calcium carbonate precipitate formed during the carbonation. This filter has very fine meshes. This last method is preferable because the apparatus needed may be substantially smaller than that for the method of settling and decanting and also because the removal is more effective.

The desilicising process according to the invention carried out at atmospheric temperature has, next to the advantage of avoiding heat exchangers in the whole process (so that additional ion exchange units may be used without first cooling the liquid to be demineralized), the benefit that the carbonation works more efficiently due to the lower solubility of the formed $CaCO_3$ at lower temperature (so that a lower Ca-content of the treated water after filtration is obtained) and due to the fact that the carbonation gas ($CO_2$) is more soluble at lower temperature than at high temperature so that a better and more complete reaction is possible between $CO_2$ and $Ca(OH)_2$.

It has been found that the process according to the invention may be improved, i.e. the silicon content of the treated water may be decreased still further, if that portion of the liquor (produced by separating the solid phase from the solution treated by mechanical friction and still containing silica-calcium compounds in the colloidally dissolved or super-saturated state) which is not recycled is filtered on its way to the carbonation tower preferably through a filter precoated with calcium carbonate nuclei formed during carbonation in a previous cycle. Due to the fact that the carbonation according to the invention may be carried out at low temperature a very fine precipitate of $CaCO_3$ originates which is an ideal material for precoating the used filters and makes it possible to decrease the silicon-content of the treated water still further, when it is filtered through said filters. This filtration has to be effected before the carbonation because during the carbonation the silica-calcium compounds break up into calcium carbonate and silica so that a filtration after the carbonation would have no effect with respect to the silicon removal. By carrying out the above-mentioned filtration a water is obtained which contains less than 1.0 mg. of silicon, calculated as $SiO_2$, per liter.

In order to accelerate the carbonation reaction, it is advantageous to carry out this carbonation under increased pressure, by which means the concentration of the carbon dioxide can be raised and thus the dimensions of the reaction apparatus can be reduced. When this carbonation is carried out under increased pressure, the carbonation tower is provided at the top with an overpressure valve to blow off the unused gases. Preferably, the solution coming from the carbonation tower is degasified in a degasifier, which is also provided with an overpressure valve.

The filtration after the carbonation step through the above-mentioned precoated filter with very fine meshes also appears to be important, because by this filtration of apparently clear water appreciable amounts of calcium carbonate are removed.

The process of the invention which produces excellent results at atmospheric temperatures, preferably comprises four steps which augment each other, each step on its own being only partially effective.

The four steps are:
(1) The mechanical friction treatment of the limed water of pH 10–14 combined with the recycle of liquor containing silica-calcium compounds in the colloidally dissolved or super-saturated state;
(2) The filtration before carbonation;
(3) The carbonation under pressure;
(4) The filtration after carbonation.

The mechanical friction treatment, by which crystallization nuclei are formed, may e.g. consist in the circulation at atmospheric temperature of the limed water by means of a centrifugal pump around a closed system of pipe lines. Due to the flow of the water under treatment through the pump and said pipe line system, friction is generated between the water and the walls of the system and it is this friction, produced while the water is in continuous contact with the recycled liquor containing silica-calcium compounds in the super-saturated or colloidal state, which give the desired formation of crystallization nuclei.

By way of example, an apparatus according to the invention is shown schemtically in the accompanying drawing. In this installation the raw water of atmospheric temperature is pumped at a rate of 60 liters/hr. at a pH of about 7.6 through pump 1 and pipe line 2 into the first reaction kettle 3. In this reaction kettle water is contained which, by adding excess lime, is brought to a pH of about 12.8. A pipe line 4 with cock 5 leads from the top of the reaction vessel 3 discharging into an open vessel 6; from this open vessel 6 a pipe line 7 leads to pump 8, pumping the water back through pipe line 9 into kettle 3. Thus, the pipe lines 4, 7 and 9 and reaction kettle 3 form a closed circuit in which pump 8 effects the circulation. From pipe line 9 through cock 10 water may now be tapped off to the mixing vessel 11 supplied with mixing means (e.g. a stirrer). In this mixing vessel the water is mixed with dry slaked lime and the milk of lime produced is brought through pipe line 12 into the supply vessel 13 from which it is brought back through pipe line 14 and dosage pump 15 into pipe line 9 and through this pipe line is pumped into reaction vessel 3. A second pipe line 16 with cock 17 leads from the top of reaction vessel 3, and is connected with the bottom of the second reaction vessel 18. At the top of this reaction vessel 18 an outlet is provided, splitting up into pipe lines 19 and 21. Pipe line 19 leads through cock 20 back to the open vessel 6, while pipe line 21 discharges through cock 22 into the open vessel 23 from which the water may be passed by way of pipe line 24 and pump 25 into filter 26. The outcoming water having normal atmospheric temperature runs through pipe line 27 into the open vessel 28 from which it is pumped by way of pipe line 29 and pump 30 to the top of the carbonation tower 31. In this tower flue gas, pre-cooled, is led countercurrent to the water, the gas being supplied by pipe lines 32 and 33. The water that is carbonated in this tower comes out through pipe line 34, is degassed in the degasser 35 and runs through pipe line 37 to vessel 38 if the pH is low enough to ensure that no free lime is still present in the water.

If this is not the case, the water may be carried back through pipe line 36 into vessel 28, after which it is again carbonated, or part of the water may be pumped around continuously.

The totally carbonated and degassed water from vessel 38 is passed by pump 40 via pipe line 39 through the second filter 41, after which the completely treated water is brought by pipe line 42 into the vessel 43. From this vessel 43 the water may be led through pump 44 through a cationic exchanger 45 and after that through an anionic exchanger 46, after which the demineralized water is suitable as feed water for steam boilers. Of course, it is also possible to eliminate, if needed, the anionic or cationic exchanger or both if such an intensive demineralizing is thought to be not necessary.

If one wishes to put such an apparatus in operation, firstly pump 8 is switched on, so that the water from the reaction vessel 3 is circulated. From supply vessel 13 by means of the dosage pump 15 enough milk of line is added until the pH of the water in the vessel 6 is brought to 12.8. During the circulation cock 5 is open, cock 17 closed and cock 10 is only open until the supply vessel 13 is filled satisfactorily. As soon as the chosen pH has been reached and has become stable, pump 1 is started through which raw water in an amount of 60 liters/hr. is added. As the capacity of pump 8 is 240 liters/hr. in this way a mixture of 60 liters/hr. fresh water with 180 liters/hr. limed water is pumped around. As soon as the whole has become stable at a pH of 12.8, cock 17 is opened, and the flow through it is adjusted to 120 liters/hr. Since the reaction vessel 18 is rather large in proportion to the reaction vessel 3 and the amount of water flowing through it smaller, the solid phase of the mixture of solid and liquid phases will settle in vessel 18, so that the new incoming water will be forced, as it were, to run through a blanket of precipitate upwards.

From this vessel 18 the water is passed through pipe lines 19 and 21 by controlling the cocks 20 and 22 in such a way that half of it, i.e. 60 liters/hr., flows back into vessel 6 and the other half of it into vessel 23. The water in both vessels 6 and 23 has a pH of 12.7. The 60 liters/hr. of pipe line 19 and 180 liters/hr. of pipe line 4 that both discharge into vessel 6 deliver together the 240 liters/hr. that pump 8 can digest, while the 60 liters/hr. of pump 1 and pipe line 2 form together the 240 liters/hr. of pump 8 and pipe line 9 the 300 liters/hr. from which 180 liters/hr. is pumped through pipe line 4 into vessel 6 and a smaller amount, viz, 120 liters/hr. runs through pipe line 16 and into reaction vessel 18. The 120 liters/hr. supply of vessel 18 divides into equal parts as already mentioned above, one part going to vessel 6 and the other part going to vessel 23. After filtration through filter 26 and carbonation in carbonator 31 and degassing in degasser 35 the water has still a pH of 9.3.

A last filtration through filter 41 makes the water suitable to be used as such or after total demineralization by cationic and/or anionic exchangers as feed water for steam boilers.

The anionic exchanger is sensitive to oxygen.

Therefore, it is recommended in the case when demineralization is effected therewith to use an oxygen-free carbonating agent (such as flue-gas) during the carbonation step in order to introduce as little oxygen as possible into the treated water.

This application is a continuation-in-part of my earlier patent application Serial No. 673,210, filed July 22, 1957 (which is now abandoned).

What I claim is:
1. Process for desilicizing feed water for steam boilers, which comprises adding milk of lime to the raw water in such a proportion as to produce a solution which has a pH of 10–14, subjecting said solution to a mechanical frictional treatment so that crystallisation nuclei are formed therein, separating the resulting solid phase from the resulting solution treated by mechanical friction so as to produce a liquor still containing silica-calcium com- pounds in the colloidally dissolved or super-saturated state, recycling a part of said liquor to the limed raw water and carbonating the remaining part by contacting it with a gas comprising $CO_2$ and then again separating the solid phase, the whole process being carried out at normal atmospheric temperature.

2. Process according to claim 1, characterized by separating once again the solids from the water prior to the carbonation through a filter precoated with calcium carbonate nuclei, formed during carbonation.

3. Process according to claim 1, characterized by separating the solid phase from the water after the carbonation with the aid of a filter precoated with $CaCO_3$-nuclei, formed during carbonation.

References Cited in the file of this patent

UNITED STATES PATENTS 2,604,444　Piccardo _____ July 22, 1952

FOREIGN PATENTS 639,408　Great Britain _____ June 28, 1950

OTHER REFERENCES

Behrman et al.: "Industrial and Engineering Chemistry," vol. 32, No. 4 (April 1940), pages 468–472 relied upon.

"Betz Handbook of Industrial Water Conditioning," published by Betz Laboratories, Philadelphia, Pa., Fifth Ed. (1957), pages 40–44 relied upon.